United States Patent [19]

Edgar et al.

[11] Patent Number: 5,579,485
[45] Date of Patent: Nov. 26, 1996

[54] APPARATUS FOR REMOTE IMPLEMENTATION OF A COMMAND

[75] Inventors: Lynne Edgar, Rochester; Ronald G. Moore, Troy; Reno V. Ramsey, Sterling Heights; Al E. Tousignant, Clinton Township, Wayne County, all of Mich.

[73] Assignee: Rockwell International Corporation, Pittsburgh, Pa.

[21] Appl. No.: 510,757

[22] Filed: Aug. 3, 1995

Related U.S. Application Data

[63] Continuation of Ser. No. 120,883, Sep. 13, 1993, abandoned.
[51] Int. Cl.⁶ .............................. G06F 13/00; G06F 7/04; H04Q 7/00
[52] U.S. Cl. ................. 395/200.14; 395/200.05; 340/825.3; 340/825.72
[58] Field of Search ................ 395/200.14, 200.05; 340/825.3, 825.31, 825.34, 825.69, 825.72, 825.73, 825.74; 455/38.2, 88.2

[56] References Cited

U.S. PATENT DOCUMENTS

| | | |
|---|---|---|
| 4,393,371 | 7/1983 | Morgan-Smith . |
| 4,509,093 | 4/1985 | Stellberger .................. 340/825.31 |
| 4,910,775 | 3/1990 | Yves et al. .................. 340/825.31 |
| 5,103,221 | 4/1992 | Memmola .................... 340/825.09 |
| 5,109,221 | 4/1992 | Lambropoulos et al. ......... 340/825.69 |
| 5,136,644 | 8/1992 | Audebert et al. ............... 340/825.31 |
| 5,146,215 | 9/1992 | Drori .......................... 340/825.72 |
| 5,214,791 | 5/1993 | Yoshizawa et al. ............... 455/38.2 |
| 5,267,299 | 11/1993 | Nomura ........................ 340/825.31 |
| 5,319,797 | 6/1994 | Salter et al. .................. 340/825.72 |

FOREIGN PATENT DOCUMENTS

| | | |
|---|---|---|
| 0459781A1 | 12/1991 | European Pat. Off. . |
| 0244332A1 | 11/1987 | France . |
| 4234822A1 | 10/1991 | Germany . |

OTHER PUBLICATIONS

Smid, Miles E., "Authentication Using the Federal Date Encryption Standard", Oct. 1981, pp. 296–301.

*Primary Examiner*—Larry D. Donaghue
*Assistant Examiner*—Mark H. Rinehart

[57] ABSTRACT

A remote signal transmitter that is capable of producing a command comprising a signal including a first value and an answer calculated using the first value as an input variable in a transfer function. The transmitter broadcasts the signal to a receiver which receives the first value and the answer. The receiver then performs a second calculation using the first value to produce a second answer. The first answer incident upon the receiver is then compared with the second answer and if a predetermined comparison test is satisfied, the subsequent command is implemented. The preferred embodiment of the present invention includes a means to increment the first value each time the transmitter is utilized. In addition, the receiver includes a screening process in which the second calculation performed by the receiver will not be performed if a previously used first value is received.

14 Claims, 5 Drawing Sheets

Fig-7

| | |
|---|---|
| 0 | 5 |
| 1 | 8 |
| 2 | 7 |
| 3 | 0 |
| 4 | 9 |
| 5 | 15 |
| 6 | 10 |
| 7 | 4 |
| 8 | 12 |
| 9 | 11 |
| 10 | 1 |
| 11 | 3 |
| 12 | 6 |
| 13 | 14 |
| 14 | 2 |
| 15 | 13 |

Fig-8

APPARATUS FOR REMOTE IMPLEMENTATION OF A COMMAND

This application is a continuation of U.S. Ser. No. 08/120,883, filed 13 Sep. 1993, which since been abandoned in favor of this application.

BACKGROUND OF THE INVENTION

1. Field of the Invention

The present invention relates to a system for transmitting a signal to a remote device and implementing a respective command, and more particularly, wherein the system features a friend/foe screening technique which provides a signal which is resistant to copying and regeneration.

2. Description of the Related Art

The present invention relates to techniques to prevent duplication of a signal utilized to communicate an implementation command to provide remote vehicle access as well as to remotely control various functions on-board a vehicle. Vehicle access codes used to accomplish such communication are susceptible to unauthorized recordation and duplication. That is, the access code of a transmitter can be duplicated by unauthorized individuals permitting unauthorized access to the vehicle. Such is especially prevalent in radio frequency remote vehicle access devices as recordation can be made with conventional magnetic tape recording devices which may then readily reproduce the signal as desired permitting unauthorized access.

An approach to prevent such duplication is to implement a rolling code. In such a system, the transmitter and receiver each advance to identical new codes each time the unit is used. Therefore, if a code is recorded by an unauthorized individual, the next time the system is used, the receiver has changed to a new code ignoring the sequentially prior code. The increased security provided by use of a rolling code comes at the cost of some inconvenience. That is, the rolling code in the transmitter and the receiver may not stay synchronized, as the transmitter may be actuated beyond the range of the receiver resulting in an increment or roll of the code stored in the transmitter without a corresponding roll of the receiver code. In this case, if the transmitter is within the look ahead range of the receiver, the receiver code will be advanced until a match occurs. However, if the transmitter is beyond the look ahead range, user action will be required. Therein lies the inconvenience as complicated techniques must be utilized to resynchronize the transmitter and receiver pair. Therefore, there is a need for a remote vehicle access system that does not require resynchronization.

SUMMARY OF THE PRESENT INVENTION

The present invention includes a remote signal transmitter that is capable of producing a command comprising a signal including a first value and an answer calculated using the first value as an input variable in a transfer function. The transmitter broadcasts the signal to a receiver which receives the first value and the answer. The receiver then performs a second calculation using the first value to produce a second answer. The first answer incident upon the receiver is then compared with the second answer and if a predetermined comparison test is satisfied, the subsequent command is implemented. The preferred embodiment of the present invention includes a means to increment the first value each time the transmitter is utilized. In addition, the receiver includes a screening process in which the second calculation performed by the receiver will not be performed if a previously used first value is received.

These and other aspects of the present invention will become more readily apparent by reference to the following detailed description of the embodiments as shown in the drawings.

BRIEF DESCRIPTION OF THE DRAWINGS

FIG. 7 is an illustration of a "S" box used with the present invention; and,

FIG. 8 is an example of a permuter table used with the present invention.

DETAILED DESCRIPTION OF THE PREFERRED EMBODIMENT

Figure 1:
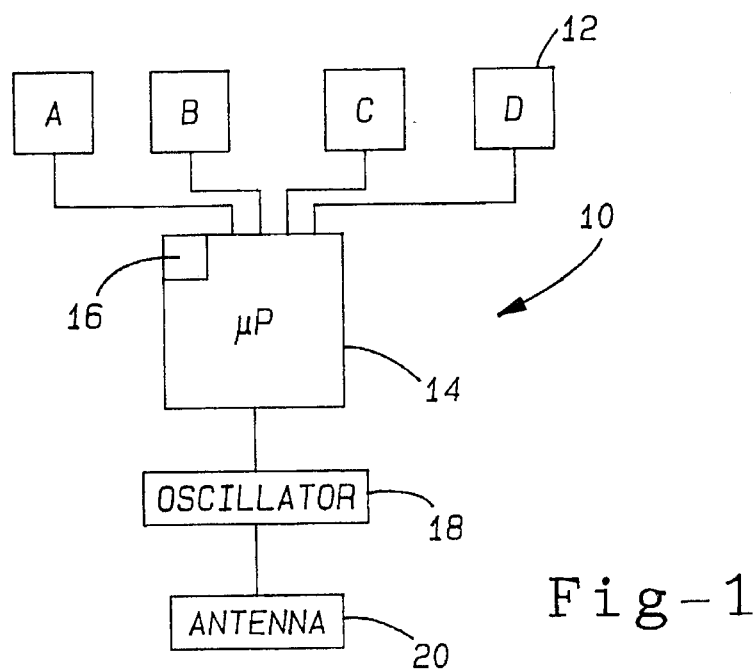
FIG. 1 is a block diagram of the transmitter of the present invention.

The preferred embodiment of the present invention, as illustrated in FIG. 1 in block diagram form, includes a transmitter 10 featuring command inputs 12 a, b, c and d, which may be used to selectively provide input signals to microprocessor 14. In the preferred embodiment of the present invention, microprocessor 14 comprises a MOTOROLA 68HCO5J2 having inputs 12 a, b, c and d which comprise conventional contact type switches. Closure of any of the contact switches produces an input signal which represents a command which causes memory 16 to produce a series of signals having a unique signature which corresponds to the respective input command. The series of signals is then supplied to oscillator 18 which implements the series of signals in the form of radio frequency signals suitable for broadcast by antenna 20.

Figure 2:
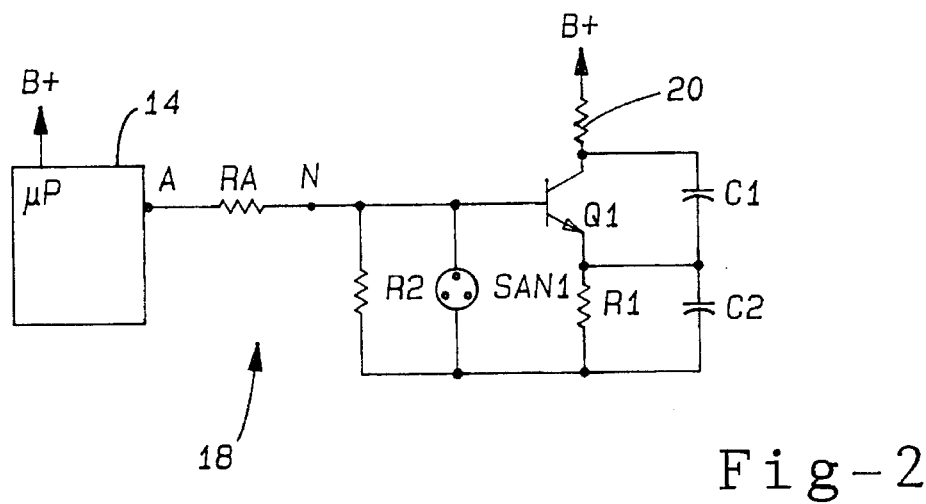
FIG. 2 is a schematic of the transmitter of the present invention.
Figure 3:
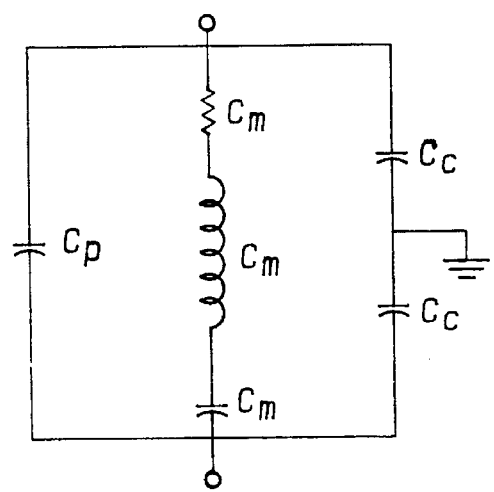
FIG. 3 is an equivalent model of the surface acoustic wave resonator of the present invention.
Figure 4:
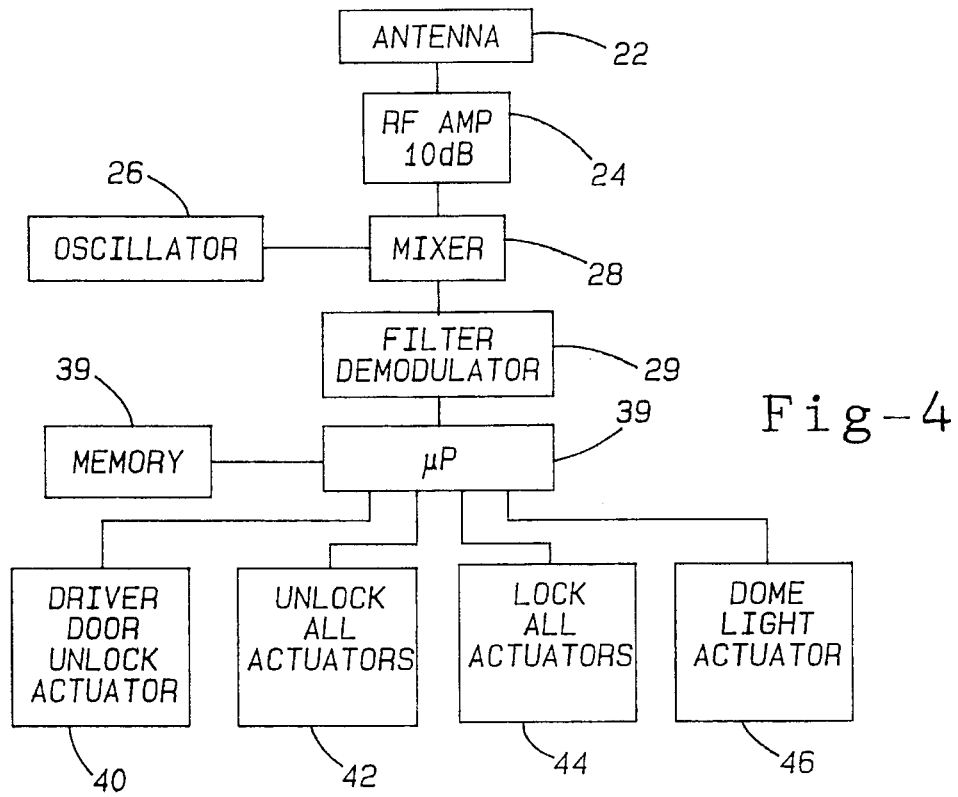
FIG. 4 is a block diagram of the receiver of the present invention.

Oscillator circuit 18, shown in FIG. 2, comprises a transistor Q1, resistors R1 and R2, in addition to capacitors C1 and C2. SAW1 stabilizes the frequency of oscillation of circuit 18 to preferably 433.92 MHz. SAW1 is a SURFACE ACOUSTIC WAVE RESONATOR having an equivalent model illustrated schematically in FIG. 3. Antenna 20 broadcasts the signal generated by circuit 18 for any duration which voltage is supplied to node N. A remote vehicle access command signal provided by transmitter 10 is intended to be incident upon a fixed vehicle antenna 22, as shown in FIG. 4. Such a signal is amplified by radio frequency amplifier 24 by a magnitude of 10 dB. Oscillator 26 provides a signal which is mixed with the access command signal in mixer 28. The resultant signal is then processed by filter/demodulator 29. The demodulator provides an output comprising logic level signals. Such signals are then processed by microprocessor 38. In the preferred embodiment, microprocessor 38 is a MOTOROLA MC68HC05P1. Microprocessor 38 accesses memory 39, an XC2401 manufactured by XICOR. Access commands are stored in memory 39 and compared in microprocessor 38. Upon encountering a match of the stored command, microprocessor 38 implements the respective command. Commands from outputs of microprocessor 38 in parallel with manual command inputs 36 effect actuation of: a) driver door lock actuator; b) unlock all actuators 42; c) lock all actuators 44; or d) dome light actuator 46.

Figure 5:
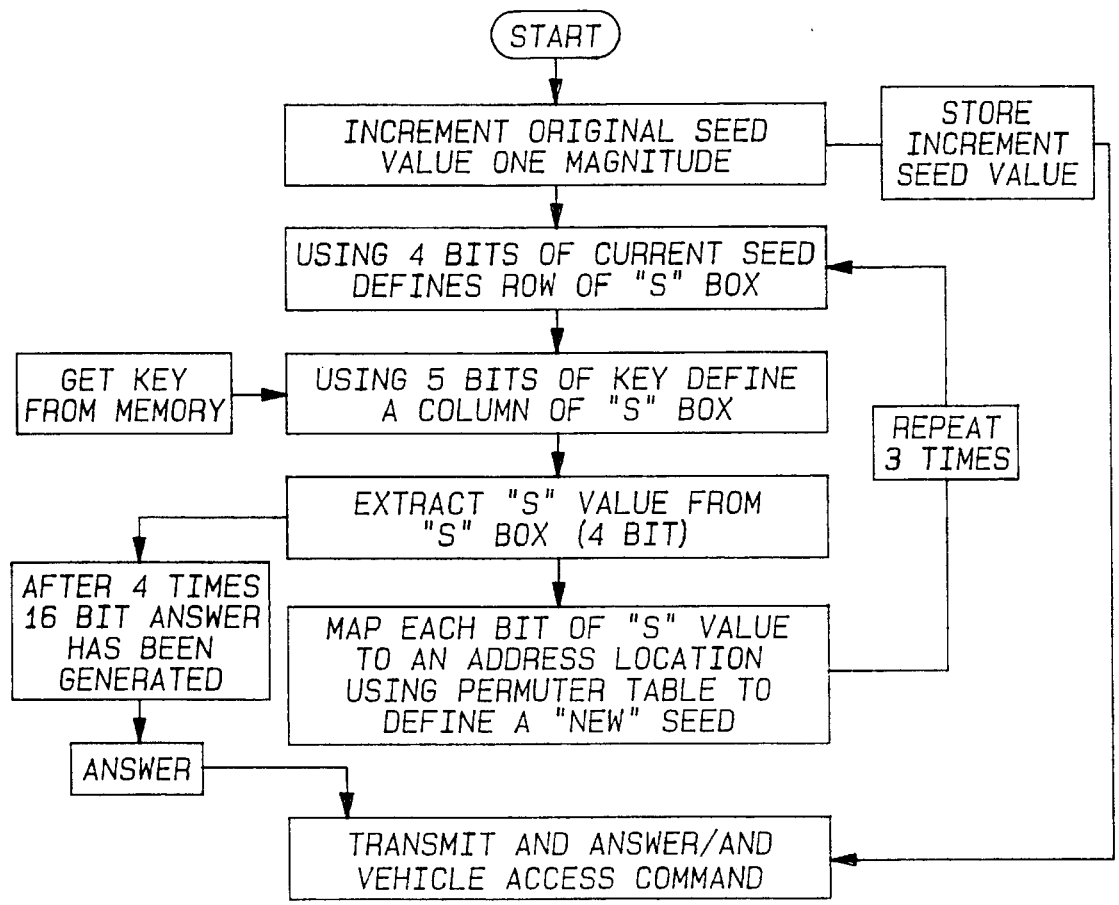
FIG. 5 a flow diagram of the process of the transmitter of the present invention.
Figure 6:
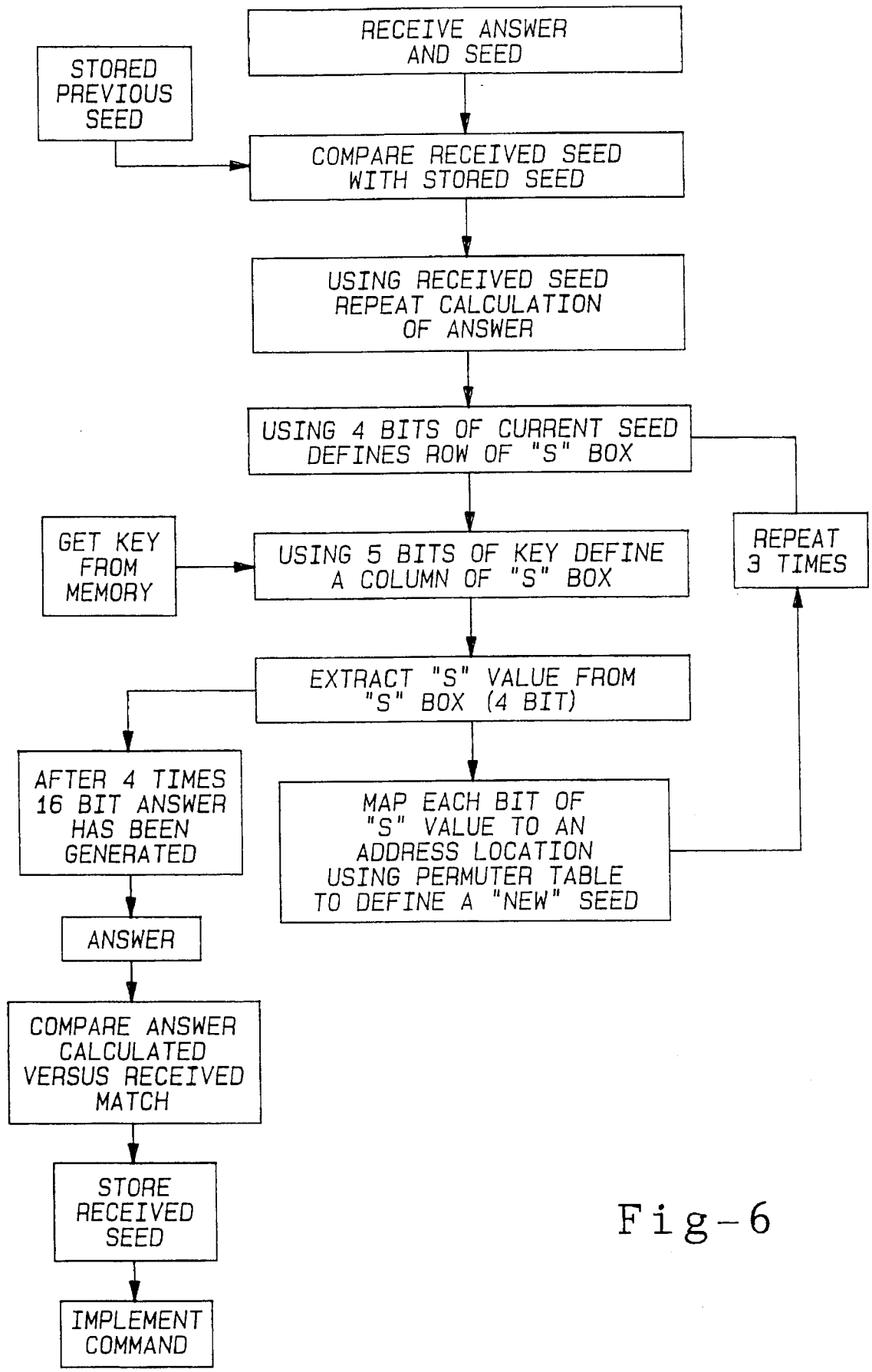
FIG. 6 is a flow diagram of the process of the receiver of the present invention.
Figure 7:
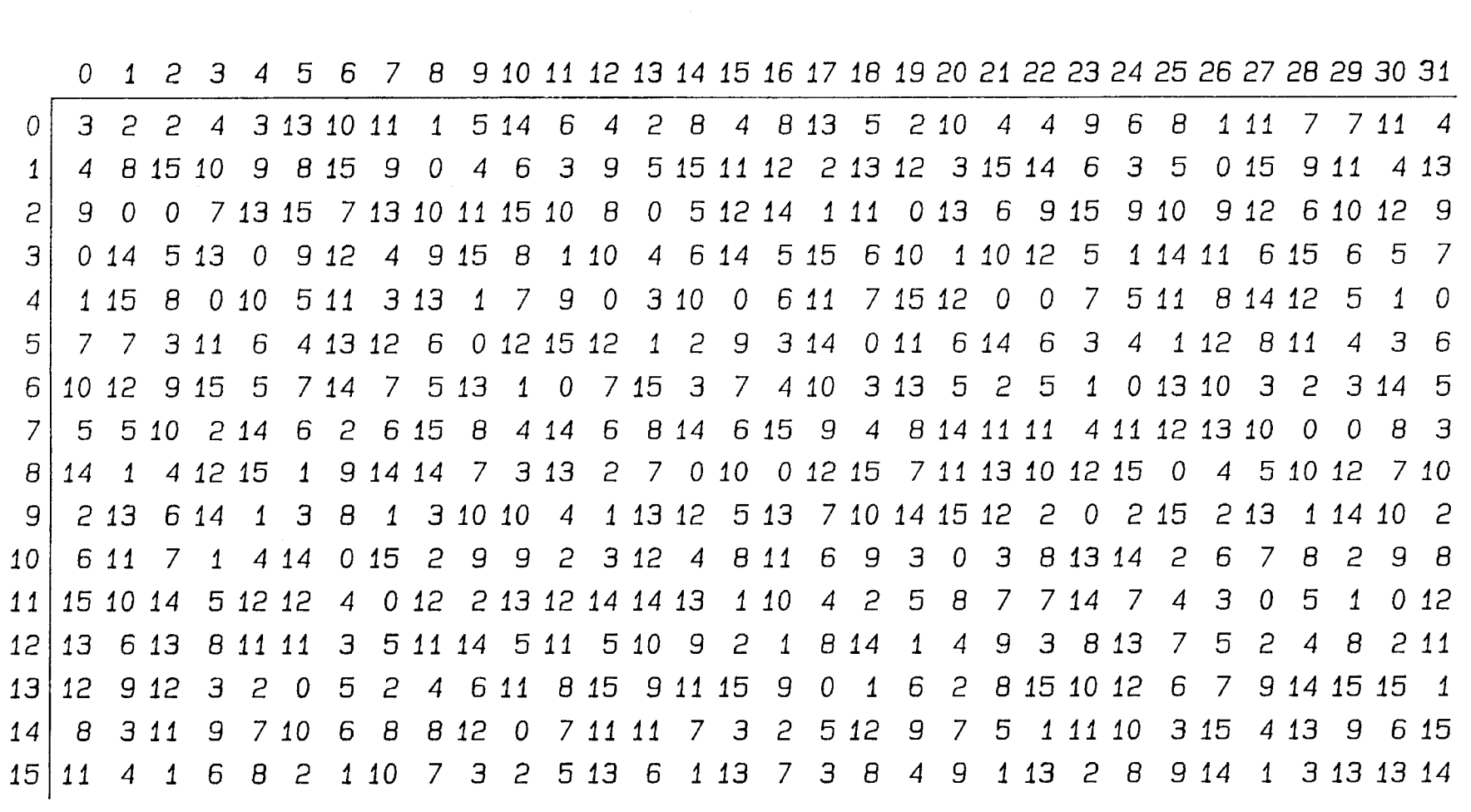

The commands produced by the transmitter of the present invention are illustrated in FIG. 5 and 6. The purpose of the transmitter is to provide a total of 3 signals which are representative of three values. A first signal is a vehicle access command which is a 20 bit binary value uniquely assigned to each transmitter/receiver pair. The second signal is a seed value which is a 16 bit binary value. The seed value is incremented by one unit of magnitude each time the transmitter transmits a vehicle access command. The third signal is an answer which is calculated using the seed value. The calculation process involves selecting 4 bits of the 16 bit seed value to define a location in an array referred to herein as the "S" box. The 4 bits of the seed value are used to define a row of the "S" box. A 40 bit binary value stored in a memory of the transmitter and referred to herein as a Key is then used to define a column location in the "S" box. This is accomplished by selecting 5 bits of the 20 bit Key to identify a column in the "S" box. Once the row and column have been identified, a value is extracted from the "S" box. An example of an "S" box is illustrated in FIG. 7. The preferred embodiment of the present invention uses an "S" box comprising a 16×32 array of 4 bit binary numbers. The numbers in the "S" box are binary values between 0 to 1 S without repeat in a column. In the preferred embodiment no two columns are identical. Next, each bit of the "S" value is placed in one of 16 address locations which are defined using a permuter table. An example of a permuter table is illustrated in FIG. 8. A single bit of the "S" value is directed to one of 16 address locations by directing the bit to a location identified in the permuter table. Each sequential access of the permuter table references the next sequential directing unit of the permuter table. Permuter table is a one column array including binary values from 0 to 15 in random order without repeat. Ideally the "S" box values are selected so that the answer calculated by the process of the present invention is not predictable. An example is provided in FIG. 6. This process is repeated three more times to provide sixteen bits of information, one at each address location. In this manner a new seed value is produced. This new seed value becomes a sixteen bit answer. However, one skilled in the art may appreciate that the process may be varied by using a seed value less than 16 bit in size, or an answer less than 16 bit in size or by repeating the calculation of the answer by using the answer to update the seed value. Once the calculation described herein has been completed, the answer, the original seed value and the vehicle access command are broadcast to the transmitter. Upon receipt of the respective signals, the received seed is compared to the next previous seed value to determine if the presently received seed value has been previously used. Then a second answer is calculated. The second answer calculated is then compared with the broadcasted answer. Upon determination that the broadcasted and second answer are identical, the seed value in the immediate transmission is stored and the respective command is implemented.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

We claim:

1. An apparatus for remote implementation of a desired command, the apparatus comprising:

means for producing a seed value;

means for calculating a first answer using a predetermined identifying value and said seed value as an input variable to a first transfer function, wherein said identifying value is truncated to produce a first truncated identifying value, and wherein said seed value is truncated to produce a first truncated seed value, and wherein said first truncated identifying value and said first truncated seed value are input into said first transfer function to produce a first partial answer, and wherein said identifying value is sequentially truncated a plurality of additional iterations to produce a plurality of subsequent truncated identifying values, and wherein said seed value is sequentially truncated a plurality of additional iterations to produce a plurality of subsequent truncated seed values, and wherein the next sequential subsequent truncated identifying value and the next sequential subsequent truncated seed value are input into said first transfer function to produce a plurality of subsequent partial answers, wherein said first answer comprises said first and plurality of subsequent partial answers concatenated on with another;

a transmitter for transmitting a first signal representative of said desired command, said seed value and said first answer;

a receiver for receiving said first signal;

means for calculating a second answer using said first signal as an input to a second transfer function;

means for performing a comparison test on said first and second answer; and means for implementing said desired command upon incident of said first and second answers satisfying said comparison test.

2. The invention of claim 1 wherein said seed value is different from previous seed values for each subsequent transmission.

3. The invention of claim 1 wherein said transmitter transmits a signal representative of a second value which is unique to said transmitter and wherein said means for calculating a second answer calculates a second answer only if said second value matches a reference value stored in said receiver.

4. The invention of claim 1 wherein said seed value is different from previous seed values by one increment of magnitude.

5. The invention of claim 1 wherein said first and second transfer function are identical.

6. The invention of claim 1 wherein said comparison test is a determination of match of said first and second answer.

7. The invention of claim 1 wherein said receiver comprises:

means for determining if said seed value has ben previously used; and means for disabling the means for calculating a second answer when said seed value has been previously used.

8. The invention of claim 1 wherein the means for producing said seed value, the means for calculating said first answer and the transmitter form a remote transmission unit.

9. The apparatus of claim 1 wherein said first transfer function comprises an array wherein said truncated identifying values and said truncated seed values are used to determine a column and a row in the array.

10. The apparatus of claim 1 wherein each said partial first answers are produced by said transfer function using a permuter table, wherein the permuter table is a one-column array including binary values from 0–15 in random order without repeat.

11. An apparatus for remotely transmitting and selectively implementing a desired command, said apparatus comprising:

means for determining a first answer by sequentially truncating a seed value into a plurality of truncated seed values, and by sequentially truncating a predetermined identifying value into a plurality of truncated identifying values, wherein each said truncated seed value and each said truncated identifying value are iteratively sequentially input into a first transfer function to produce a sequence of partial answers, wherein each partial answer is concatenated to produce said first answer;

means for transmitting said desired command, said seed value and said first answer in a first signal;

means for receiving said first signal;

means for determining a second answer using said seed value, and for comparing said first answer to said second answer, and for implementing said desired command only when said first and second answers match.

12. An apparatus in accordance with claim 11 wherein said first transfer function comprises an array wherein said columns and rows are indexed by said truncated seed values and said truncated identifying values.

13. An apparatus in accordance with claim 12 wherein said transfer function further includes a permuter table, and wherein, during each iteration, an array element of said array is indexed according to one of said truncated seed values and one of said truncated identifying values, and wherein said indexed array element is input into said permuter table to produce one of said partial answers.

14. An apparatus in accordance with claim 13 wherein said array elements comprise binary values varying from zero through "x" inclusive arranged in random fashion without repeat within each column, and wherein said first answer comprises an "n"-bit value, and wherein said permuter table comprises a one-column array with values varying from zero through "n" inclusive arranged in random fashion without repeat, and wherein each indexed array element when concatenated one with another produce an "n"-bit value, and wherein each bit of said "n"-bit value is mapped in said permuter table such that said mapped bits comprise said first answer.

* * * * *